Patented Feb. 21, 1950

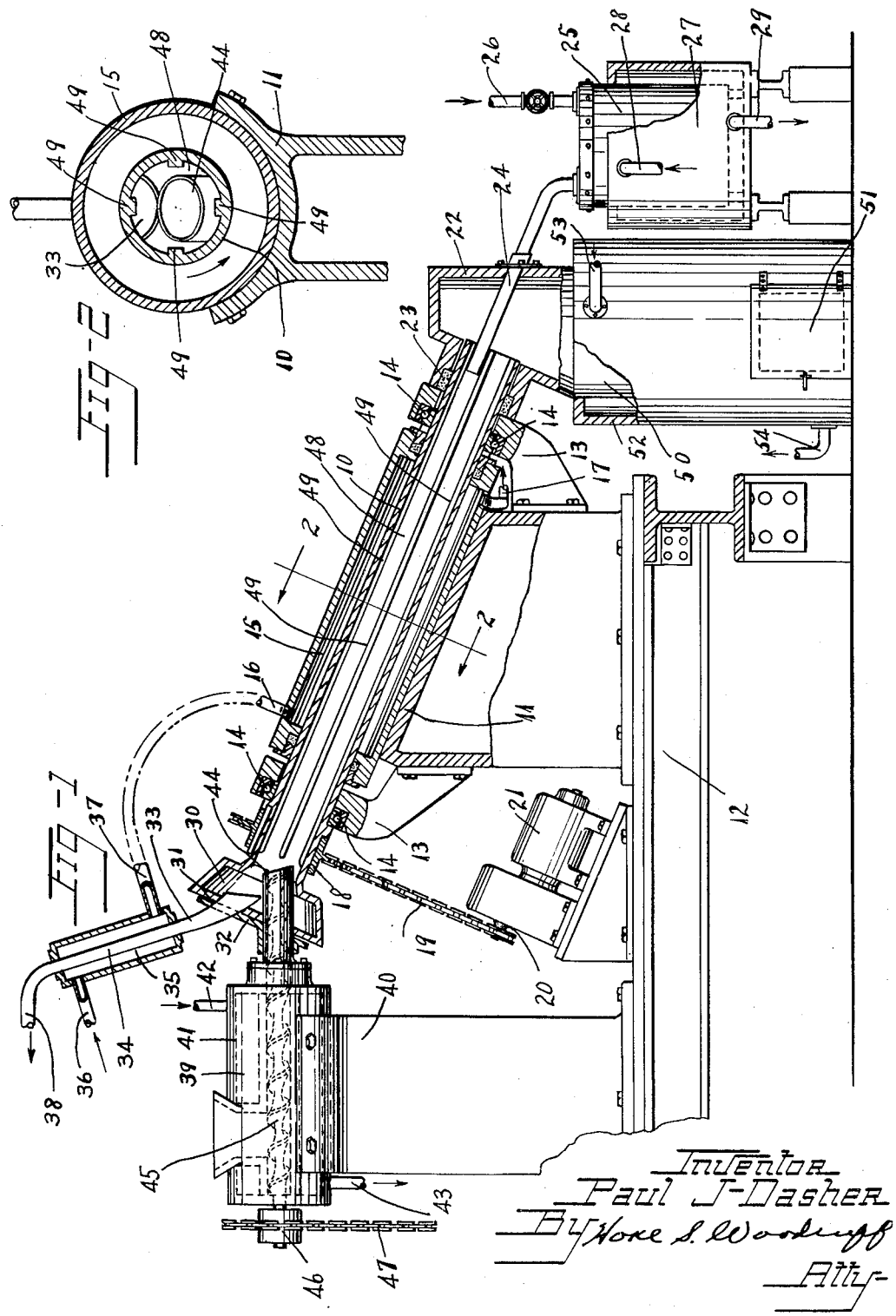

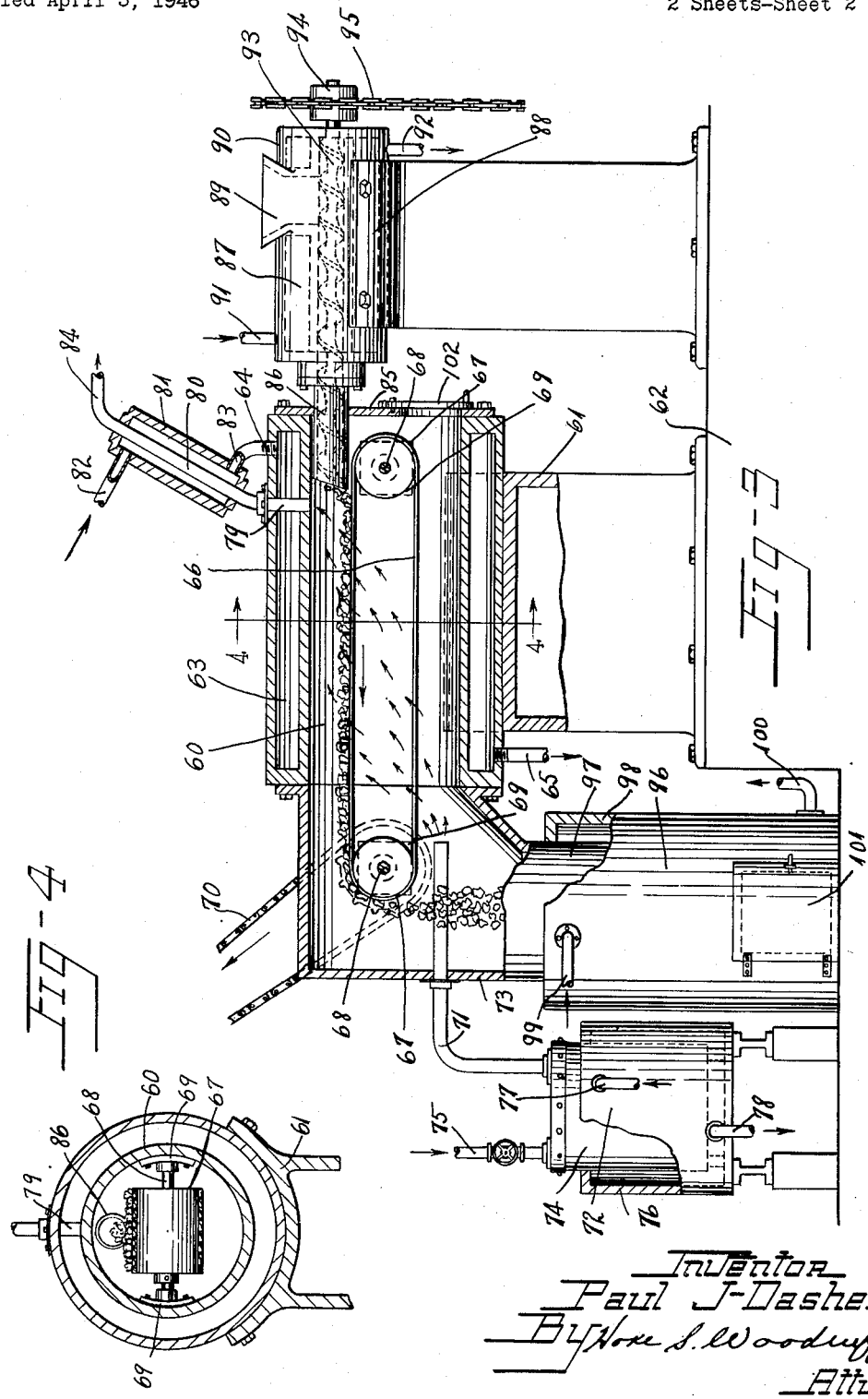

2,498,398

UNITED STATES PATENT OFFICE 2,498,398

RECLAIMING COMPOSITE MATERIAL

Paul J. Dasher, Willoughby, Ohio, assignor to The B. F. Goodrich Company, New York, N. Y., a corporation of New York Application April 3, 1946, Serial No. 659,403

12 Claims. (Cl. 260—711)

This invention relates to reclaiming of composite material comprising acid-resistant plastic material and cellulosic material associated together, and particularly to treatment of such composite material to disintegrate the cellulosic material.

Prior to this invention, the disintegration and separation of cellulosic material from acid-resistant plastic material was a tedious and costly procedure. In the case of scrap rubber containing cellulosic reinforcement, for example, the customary procedure was to dissolve out and discard the cellulosic material, since reprecipitation of the dissolved material was unsatisfactory and impractical.

Thus Dawson and Scott reported in the Proceedings of the Rubber Technology Conference for 1938 that utilization of the textile fiber in scrap rubber is one of the problems which has not been satisfactorily solved, since the methods available involve solution of the rubber which contains the fibers, and removal of the fibers by other suitable means.

By means of the present invention the cellulosic materials are reclaimed quickly and economically in a usable, non-fibrous form. Another advantage of the present invention is that both the cellulosic materials and the plastic material obtained by treatment according to this invention are effectively dry. In the previously used acid or alkali processes of reclaiming, the cellulosic material was removed but the resulting treated material had to be washed and dried before proceeding further and the cellulosic material was lost.

In general, this invention relates to treating composite material comprising acid-resistant plastic material and cellulosic material associated together, such as ordinary scrap rubber containing cotton or other fiber reinforcement, with vapors of an acid having a degrading effect on cellulosic material in the presence of a limited and very small amount of water. Prior to this invention the material to be treated was immersed in an aqueous solution of such an acid, and the resulting treated material was thoroughly wet and saturated with acid. This necessitated washing and drying the treated material before proceeding further; and as previously indicated, the cellulosic material dissolved in the acid solution was discarded since it was impractical to recover it in usable form.

In treating material according to my invention, the material remains essentially dry during the treatment which is carried out in the presence of sufficient water to effect degradation of the cellulosic material but insufficient to render it wet. Thus the material being treated is essentially dry to the ordinary senses such as touch and sight since it usually contains less than around 25% moisture and usually less than 10% moisture. Ordinary scrap rubber having cellulosic reinforcement usually contains about 10% of moisture on the average even when it is dry for all practical purposes.

In the treatment of material according to this invention the acid vapors degrade the cellulosic material to a friable condition. This friable material is thereafter physically disintegrated by the application of external pressure to the treated composite material. The resulting finely powdered, essentially dry cellulosic material can then be separated from the more coarsely subdivided plastic material by any means which is suitable.

In referring herein to plastic material I have reference to that class of materials which are generally grouped together under the name of "plastics," rather than to a physical property of the material. Thus, for example, hard rubber as well as soft vulcanized rubber and unvulcanized rubber all are included in the term plastic material as used here since the rubber industry is commonly classed as a plastics industry. Also included in the term plastic material as used here are, of course, such materials as the phenolic, melamine, and urea resins; asphaltic materials; polymers of vinyl chloride, vinyl acetate, vinylidene chloride and copolymers of these materials, rubber-like materials such as balata, guayule, and gutta percha; polymers of butadiene, isoprene, chloroprene, and isobutylene as well as copolymers of these materials with styrene, acrylonitrile, methyl acrylate, methyl methacrylate and other copolymerizable monomers; and similar materials.

The disintegrated cellulosic material which is obtained by treatment according to this invention is uncarbonized and undissolved. It is obtained as a fine powder which is essentially dry and only slightly acidic. The acid-resistant plastic material goes through the treatment unchanged and can be processed further as desired without the necessity of intermediate operations such as washing and drying.

The preferred method, which is explained in detail later, involves the use of vapors comprising substantially constant boiling proportions of acid and water since such vapors can be readily generated from a constant boiling mixture without the use of elaborate control equipment. The treatment is easily controlled and neither the plastic material nor the cellulosic material is adversely affected. The reaction time and temperature are such that, in the case of scrap rubber, no plasticizing action is involved and the rubber comes through the treatment unchanged. In this method, the treatment is preferably carried out at a temperature sufficiently high to prevent substantial condensation of the vapors on the material being treated.

An outstanding result of this invention is its effect on the economics of rubber reclaiming. In the commonly used alkali process, the alkali is used for removal of the cellulosic material as well as reclaiming of the scrap rubber. Thus, in the ordinary reclaiming operation, nearly half of the capacity of the alkali digestors is taken up by the cellulosic materials. By removing the cellulosic materials prior to reclaiming, the present reclaiming capacity is, in effect, increased approximately 80%. In addition, the cellulosic material is reclaimed in usable form under the present invention instead of being lost as in the alkali process.

According to the present invention, the cellulosic fibers are rendered friable in a period of time less than five minutes. Since the apparatus necessary for use in the treatment is relatively simple and the output of treated scrap is large, it is practical to remove the cellulosic materials and reclaim the scrap rubber in separate steps. Furthermore, the present invention makes the use of special reclaiming agents feasible. For example, the use of certain polyamine reclaiming agents has been hampered by their interaction with the cellulosic materials in the scrap rubber. Prior to this invention, it was necessary either to use rubber which had no cellulosic reinforcement or to remove the cellulosic reinforcement before use of such special agents. In removing the cellulosic materials by the conventional methods, it was necessary to wash and dry all the scrap after the fiber had been removed. Since the scrap obtained under the present invention is effectively dry, additional drying is not necessary.

The invention will now be described in greater detail as exemplified by certain preferred embodiments illustrated in the accompanying drawings, Fig. 1 is a side elevational view of a preferred form of apparatus for use in practicing the invention, portions of the apparatus being shown in section for clarity of illustration;

Fig. 2 is a sectional view taken on line 2—2 of Fig. 1;

Fig. 3 is a side elevational view of another form of apparatus for use in practicing the invention, portions of the apparatus being shown in section; and Fig. 4 is a sectional view taken on line 4—4 of Fig. 3.

In the preferred apparatus as illustrated by Fig. 1, an inclined rotatable chamber 10 of tubular configuration is supported on an inclined cradle 11 mounted on an I-beam base 12. The ends of the chamber 10 are supported by stationary housings 13, 13 which are fastened to the cradle 11. The chamber is supported against the stationary housings 13, 13 by means of thrust bearings 14, 14 which allow the chamber 10 to rotate within the housings. The chamber proper 10 is enclosed by a heating jacket 15 through which a heating fluid may be circulated through the inlet 16 and the outlet 17.

The chamber 10 is rotated by means of a sprocket 18 engaging a sprocket chain 19 which is driven through a gear reduction unit 20 by a motor 21 mounted on the I-beam base 12.

The lower end of the inclined chamber 10 is enclosed by a chamber housing 22 which extends around the inclined chamber up to the lower stationary housing 13 and which has a packing 23 forming a vapor-tight seal around the lower end of the rotating, inclined chamber. An inlet pipe 24 introduces vapors from a generating chamber 25 into the chamber housing 22 and the inclined chamber 10. The generating chamber 25 consists of an enclosed receptacle provided with an inlet tube 26 for charging the receptacle with the acid mixture to be vaporized. The chamber is provided with a heating jacket 27 through which heating fluid is circulated by means of the inlet 28 and outlet 29.

The upper end of the inclined chamber is flared to form a truncated conical section 30 having a circular opening in the upper face 31. This section rotates against a face plate 32 which is positioned against the upper face 31 of the truncated conical section 30 so as to provide a vapor-tight seal over the circular opening. An outlet tube 33 leads from the conical section 30 through the plate 32 into an upwardly extending exhaust flue 34 to lead off the vapors which have been generated in the chamber 25 and have passed upwardly through the inclined chamber 10 where the treatment of composite material takes place. The exhaust flue 34 is provided with a heating jacket 35 which is heated by fluid passed into the jacket through the inlet 36 and through the outlet 37 which may be connected to the inlet 16 of the heating jacket 15 for the inclined, rotating chamber 10. The exhaust flue 34 acts much as a chimney in creating a positive flow of vapors through the apparatus, and the heating jacket 35 prevents condensation of the vapors until they have passed through the flue outlet 38 into an absorption reservoir such as is commonly used for reclamation of acidic vapors.

The material to be treated after being ground is introduced into a preheating chamber 39 which is supported by a horizontal cradle support 40 which is mounted on the I-beam base 12. The preheating chamber has a jacket 41 provided with an inlet 42 and an outlet 43 by means of which heating fluid is circulated through the jacket 41. The preheating chamber is connected to the inclined, rotating chamber 10 by a tubular feed-in member 44 which extends through the face plate 32 and terminates in the mouth of the rotating chamber proper. The pre-heating chamber 39 is provided with a revolving screw 45 which is rotated by a sprocket 46 driven by a sprocket chain 47 which is connected to a power source not shown here. The revolving screw 45 extends through the preheating chamber 39 and the feed-in member 44 and introduces the heated, ground material to be treated into the rotating chamber 10 in a thin uniform layer which can be readily subjected to treatment with the vapors which are passed counter-currently through the chamber 10.

The inner surface 48 of the rotating chamber 10 is provided with a number of rib-like projections 49, 49 extending longitudinally through the rotating chamber. Each of these rib-like projections carries a portion of the ground material, which has been introduced into the chamber, up through part of a revolution of the inclined chamber. As each projection reaches the upper part of the revolution, the ground material it is carrying slides off the rib and drops to the floor of the chamber where the process is repeated. Since the rotating chamber is inclined, the material moves downwardly along the slope of the chamber each time it slides off a projecting rib. Thus the time necessary for material to move through the chamber is a function of the rate of rotation and the inclination angle of the chamber and the distance the material is lifed before it falls. In the preferred embodiment, these factors are chosen so that the material being treated is in the reaction zone for approximately three to four minutes.

During the movement of the ground material through the reaction chamber, it is continuously exposed to the countercurrent stream of acidic vapors. The method of moving the material through the chamber as described above results in exposing all surfaces of the ground material to the vapors. By the time the material reaches the lower end of the reaction chamber, the cellulosic material in the ground material has been rendered friable so that the application of slight external pressure will reduce it to a fine powder.

The ground material after passing downwardly through the length of the rotating chamber is dropped into a terminal heating chamber 50 which opens into the chamber housing 22 which encloses the lower end of the rotating chamber. This heating chamber is a large receptacle provided with a hinged door 51 by means of which the treated material may be removed from the apparatus. The chamber is provided with a jacket 52 which heats the chamber by means of heating fluid which is circulated through the jacket by means of the inlet 53 and outlet 54.

Thus, in the treatment of composite material comprising acid-resistant plastic material and cellulosic material associated together, as for example in the treatment of tire scrap containing cotton cord, the scrap is ground to a degree of fineness of the order of 2 to 5 mesh such that portions of substantially all the cellulosic fibers are exposed to some degree. The scrap usually contains from 6% to 10% moisture as received which is considered to be essentially dry. On the average, the cellulosic materials will constitute approximately 40-45% of the material to be treated, although this may vary markedly with material containing scrap largely from a single source, various specific scrap materials being found to contain amounts of cellulosic material both considerably lower and considerably higher than the average indicated.

In the treatment of tire scrap, the generating chamber 25 is partially filled with a constant boiling mixture of hydrochloric acid and water. This mixture contains about 21% HCl by weight and has a boiling point of approximately 109° C. The concentration and boiling point will vary slightly with changes in atmospheric pressure but the mixture will quickly adjust to constant boiling proportions. Hydrochloric acid is preferably used because of its availability and the low boiling point of the constant boiling mixture.

The generating chamber 25 is heated to provide a continuous flow of acidic vapors which pass up through the rotating chamber as indicated previously. Upon exhausting out of the flue 34, the vapors are reclaimed and sufficient of the concentrated hydrochloric acid of commerce is added to bring the reclaimed acid back to constant boiling proportions.

The ground scrap is introduced into the preheating chamber 39 where is is brought to a temperature near the boiling temperature of the constant boiling mixture. The heated material is then introduced into the rotating, inclined chamber 19 by means of the revolving screw 45 in a continuous, even layer which is moved downwardly through the chamber as described. During the treatment in the inclined chamber the ground mixture is maintained at a temperature sufficiently high to prevent substantial condensation of the acidic vapors on the ground scrap, e. g., a temperature not substantially lower than the boiling point of the constant-boiling mixture.

The ground material is in continuous contact with the acidic vapors for about three to four minutes during passage through the rotating chamber in which time the cotton cord is degraded to a friable condition. The treated material then drops into the terminal heating chamber 50 where it is heated additionally for a time sufficient to drive off residual acid. By maintaining a sufficient amount of material in this chamber, the treated scrap may be removed from the bottom of the chamber without creating an opening into the apparatus proper through which acidic vapors can escape.

The effectively dry and slightly acid material which is removed from the apparatus is thereafter subjected to a physical disintegrating treatment by means of which the friable cotton cord is reduced to a fine powder. This treatment consists of subjecting the treated material to the action of a physical disintegrator such as a hammer mill, a roller mill, a ball mill or other similar means. The finely powdered cellulosic material is then separated from the more coarsely ground scrap rubber by any suitable means, such as by passing a current of air over the mixture or by screening the mixture. The air current may be either a positive pressure flow or a vacuum, as desired.

The cellulosic material which is obtained has not been carbonized, and in the effectively dry, powdered state may be subjected to bacterial action to produce alcohol, such as butyl alcohol, or may be dissolved and used for the production of synthetic fibers such as rayon, or may be suitably treated to provide activated carbon black of the general type commonly used.

The scrap rubber is not appreciably affected by the short exposure to the acidic vapors and shows no evidence of plasticizing action or chlorination. Since it is only slightly acid and effectively dry, it may then be reclaimed by any of the known reclaiming means without further washing or drying.

The method described is applicable to either vulcanized or unvulcanized rubber as well as other acid-resistant plastic material. The cellulosic materials removed in this manner include cotton, rayon, ramie, manila hemp, sisal hemp, wood, jute, lignin, and similar materials.

Another form of apparatus which may be used is shown in Fig. 3 and consists of a stationary, horizontal reaction chamber 60 of tubular configuration supported by a cradle 61 which is mounted on a solid base 62. This chamber 60 is provided with a jacket 63 through which heating fluid is circulated by means of the inlet 64 and outlet 65. A perforated, continuous belt 66 extends longitudinally through the chamber and is completely enclosed by the chamber. This belt 66 is mounted on pulleys 67, 67 situated at either end of the chamber. The pulleys 67, 67 are mounted on axles 68, 68, one of which seats in a pair of brackets 69, 69 which are rigidly secured to the chamber wall and the other of which extends through the chamber wall and seats in an external support (not shown). The latter axle is rotated by means of a sprocket chain 70 which is driven by a power source not shown here. The rotating pulley maintains the perforated belt in motion so as to carry the material to be treated through the length of the chamber.

An inlet tube 71 from a generating chamber 72 extends through the end wall 73 of the reaction chamber 60. The generating chamber 72 consists of a receptacle 74 which is provided with an inlet 75 for charging acid into the receptacle. The receptacle 74 is provided with a heating jacket 76 through which heating fluid is circulated by means of the jacket inlet 77 and outlet 78.

The acidic vapors generated in the chamber are thus introduced into the reaction chamber 60 through the inlet tube 71. The upper wall of the opposite end of the reaction chamber is provided with an opening 79 through the chamber wall and the heating jacket and leading into an exhaust flue 80 which extends upwardly from the reaction chamber 60 and acts much as a chimney to provide a positive flow of vapors through the reaction chamber. This flue is provided with a heating jacket 81 which prevents condensation of the acidic vapors in the flue. Heating fluid is circulated through the jacket 81 by means of the inlet 82 and the outlet 83 which carries the fluid into the inlet 64 of the heating jacket 63 of the reaction chamber 60. The outlet 84 of the exhaust flue 80 is connected to an absorption reservoir not shown here such as is commonly used for the reclamation of acidic vapors.

The end wall 85 of the reaction chamber 60 adjacent to the exhaust flue is provided with an opening through which extends the feed-in member 86 of a preheating chamber 87 which is supported by a cradle 88 mounted on the base 62. The preheating chamber 87 is provided with a funnel opening 89 through which the ground material to be treated is introduced into the preheating chamber. The details of the preheating chamber 87 are the same as those of the apparatus previously described and consist of a heating jacket 90 having an inlet 91 and outlet 92, a revolving screw 93 rotated by a sprocket 94 driven by a sprocket chain 95 which is connected to a power source not shown here. The revolving screw introduces heated ground material into the reaction chamber 60 through the feed-in member 86 and drops it in a thin, continuous layer on the moving, continuous belt 66 in condition to be treated by the vapors. The belt carries it the length of the reaction chamber 60 in contact with the acidic vapors and drops the treated material into a terminal heating chamber 96 which opens into the reaction chamber. This terminal heating chamber 96 in which residual acid is removed from the treated material is similar to that in the previously described preferred apparatus and comprises a receptable 97, a heating jacket 98 provided with an inlet 99 and outlet 100, and has a hinged door 101 near the bottom of the chamber for the removal of treated material.

In this apparatus since ground material may drop off the belt and collect on the floor of the reaction chamber 60, a door 102 is provided in the end wall of the reaction chamber to facilitate removal of such material.

The method of treating material in this form of apparatus varies from the preferred method previously described only in the method of moving the material through the chamber. The details of the treatment are as previously described.

Both forms of apparatus previously described are designed for treating the composite material with acid vapors under atmospheric pressure substantially. The treatment may be accelerated, however, if carried out under elevated pressures in suitably modified equipment and such operations are not excluded from the scope of the invention.

The apparatus should, of course, be constructed of acid-resistant material at least in those parts in contact with the acid or acidic vapors. These materials include glass, acid-resistant metals and metallic alloys of suitable composition, tile, porcelainized material, rubber or rubber-lined material, and similar materials.

Another less preferred method for treating plastic materials involves bringing the ground material to a definitely controlled moisture content, and subsequently subjecting the conditioned material to dry hydrogen chloride gas to render the fibers friable. Since this method necessitates more elaborate control equipment, and since hydrogen chloride gas is difficult to handle in factory operations, the methods previously described are preferred. In such a method, there is also greater danger of carbonization of the cellulosic fibers which is not desirable where the cellulosic materials are to be reclaimed.

The treatment of plastic material may, of course, be carried out in a batchwise manner. Thus, a suitable amount of the material to be treated may be supported in contact with the acid vapors for a time sufficient to render the cellulosic material friable, and the treatment continued as previously described.

In the methods described previously, the procedure as to preheating and subsequent heating of the scrap may be varied, modified, or dispensed with if so desired. The acid used is preferably hydrochloric acid because of its availability, ease of vaporization, and the low boiling temperature of the constant-boiling mixture. Any vaporizable acid such as nitric or sulfuric acid which has a degrading effect on cellulosic material, may be used, however, and the examples given are not intended to limit the scope of this invention unless otherwise specifically indicated.

The preferred methods which have been described in detail involve separation of the disintegrated cellulosic material from the acid-resistant plastic material. In some cases, however, it may be desirable to merely disintegrate the cellulosic material and allow it to remain in the plastic material as a finely-divided filler material. Thus, for example, in the case of unvulcanized scrap rubber containing cellulosic reinforcement, the cellulosic material may be disintegrated and subsequent processing will result in a homogeneous mixture with the cellulosic filler material in a fine enough state of subdivision so as not to adversely affect the physical properties of the rubber compound.

The finely-divided, essentially dry cellulosic material which is obtained by this method will vary in structure depending upon the cellulosic material in the original composite material. In the case of naturally occurring cellulosic materials such as cotton, hemp, jute and lignin, the structure will be that of acid-degraded cellulose which has not been dissolved. In the case of synthetic cellulosic material such as rayon which has no cellular structure in the untreated state, the structure will be that of previously dissolved cellulose which has been acid-degraded. In either case, however, the product will be uncarbonized which makes it possible to use the product in the production of further cellulosic derivatives. Thus, for example, the cellulosic material obtained from cotton or similar materials by the method of this invention may be used to produce synthetic materials such as rayon, or may be subjected to saccharification, or may be treated to produce alcohols such as butyl alcohol or similar materials. For the purposes of this discussion, the above possibilities are given as an indication of a few of the possible uses of the reclaimed cellulosic material without attempting to enumerate all of them.

The degradation of cellulosic material according to this invention is a very economical process since the weight of vapors used in the treatment is but a fraction of the weight of the material being treated and all the acid is recovered except that which interacts with the cellulosic material. This recovered acid has a concentration below constant-boiling proportions but is returned to constant boiling proportions by the addition of a suitable amount of the concentrated hydrochloric acid of commerce in the method described above.

While the invention has been described in considerable detail with reference to preferred methods and apparatus and materials, it will be understood that variations and modifications thereof may be effected without departing from the spirit and scope of this invention as defined in the appended claims.

I claim:

1. In the method of processing composite material comprising rubber material and cellulosic fiber, the steps which comprise providing said composite material in a comminuted condition and subjecting said composite material to aqueous vapors of a mineral acid for a period of time less than five minutes to degrade said cellulosic fiber to a friable condition without substantial carbonization thereof while maintaining said composite material at a temperature above the boiling point of a constant boiling aqueous solution of said acid, said composite material being in an essentially dry condition during and after treatment with said vapors.

2. In the method of processing composite material comprising acid-resistant rubber material and cellulosic fiber, the steps which comprise comminuting said composite material and subjecting said material to heated vapors of a constant boiling aqueous solution of a mineral acid for a period of time less than five minutes to degrade the cellulosic fiber to a friable condition without substantial carbonization thereof while maintaining said material at a temperature sufficiently high to prevent substantial condensation of said vapors upon the surface of said material.

3. In the method of processing composite material comprising rubber material and cellulosic fiber, the steps which comprise comminuting said composite material, subjecting said material to heated vapors of a constant boiling mixture of a mineral acid and water at a temperature approximately equal to the boiling point of said mixture for a period of time less than five minutes to degrade the fibers to a friable condition without substantial carbonization thereof, and thereafter subjecting the composite material to a physical disintegrating treatment to substantially disintegrate the friable cellulose fiber.

4. In the method of processing composite material comprising rubber material and cellulosic fiber, the steps which comprise comminuting said composite material, subjecting said composite material to heated vapors of a constant boiling mixture of a mineral acid and water at a temperature approximately equal to the boiling point of said mixture for a period of time less than five minutes to degrade the cellulosic fibers to a friable condition without substantial carbonization thereof, physically reducing the friable fiber to powder, and thereafter separating the cellulosic powder from the rubber material.

5. In the method of processing composite material comprising rubber material and cellulosic fiber, the steps which comprise comminuting said composite material, subjecting said composite material at substantially atmospheric pressure to vapors of a constant boiling mixture of a mineral acid and water at a temperature approximately equal to the boiling point of said mixture for a period of time less than five minutes to degrade the cellulosic fiber to a friable condition without substantial carbonization thereof, physically reducing the friable fiber to powder, and thereafter passing a current of air across the composite material to separate the cellulosic powder from the rubber material.

6. In the method of processing composite material comprising rubber material and cellulosic fiber, the steps which comprise comminuting said composite material and subjecting said composite material at substantially atmospheric pressure to vapors of a constant boiling aqueous solution of a mineral acid at the boiling point thereof for a period of time less than five minutes to degrade said fiber to a friable condition without substantial carbonization thereof while maintaining the material at substantially the temperature of said vapors to prevent substantial condensation of said vapors on said composite material.

7. In the method of processing composite material comprising rubber material and cotton fiber, the steps which comprise comminuting said composite material, subjecting said composite material at substantially atmospheric pressure to vapors of a constant boiling aqueous solution of a mineral acid for a period of not more than 4 minutes to degrade the cotton fiber to a friable condition without substantial carbonization thereof, maintaining said composite material, while subjected to said vapors, at a temperature sufficiently high to prevent substantial condensation of the vapors on said composite material, physically reducing the friable fiber to powder, and thereafter separating the powder from the rubber material.

8. In the method of processing composite material comprising rubber material and cotton fiber, the steps which comprise subjecting the composite material in a comminuted condition to vapors of constant boiling hydrochloric acid for 3–4 minutes to degrade the cellulosic fiber to a friable condition without substantial carbonization thereof while maintaining the temperature of said composite material substantially at 109° C. to prevent substantial condensation of the vapors thereon.

9. In the method of reclaiming composite material comprising rubber material and cellulosic fiber, the steps which comprise progressively moving said composite material in a comminuted and dispersed condition through a treating zone, passing about said composite material in said zone vapors of constant boiling hydrochloric acid for a period of time less than five minutes to degrade said fiber to a friable condition without substantial carbonization thereof while heating said material at a temperature approximately equal to the boiling point of said acid to prevent substantial condensation of said vapors thereon.

10. The method of processing composite material comprising rubber material and cellulosic fiber, which method comprises continuously advancing said material in comminuted form through an elongated treating zone, and continuously passing a stream of vapors of an aqueous mineral acid through said zone countercurrently to said comminuted material in contact therewith to degrade said fiber to a friable condition without substantial carbonization thereof with a contact time less than five minutes at a temperature approximately equal to the boiling point of a constant boiling aqueous solution of said acid.

11. The method of processing composite material comprising rubber material and cellulosic fiber, which method comprises continuously advancing said material in comminuted form through an elongated treating zone, and continuously passing a stream of vapors of constant boiling aqueous hydrochloric acid through said zone countercurrently to said comminuted material in contact therewith to degrade said fiber to a friable condition without substantial carbonization thereof with a contact time less than five minutes at a temperature approximately equal to the boiling point of said acid.

12. The method of processing composite material comprising rubber material and cellulosic fiber, which method comprises continuously advancing said material in comminuted form through an elongated treating zone, continuously passing a stream of vapors of constant boiling aqueous hydrochloric acid through said zone countercurrently to said comminuted material in contact therewith to degrade said fiber to a friable condition without substantial carbonization thereof with a contact time less than five minutes at a temperature approximately equal to the boiling point of said acid separating said treated comminuted material from said stream of acid vapors in a substantially dry condition, mechanically reducing the friable fiber of said composite material to a powder, and separating said powder from said rubbery material.

PAUL J DASHER.

REFERENCES CITED

The following references are of record in the file of this patent:

UNITED STATES PATENTS

| Number | Name | Date |
|---|---|---|
| 395,987 | Mitchell | Jan. 8, 1889 |
| 679,203 | Althausse et al. | July 23, 1901 |
| 823,053 | Kanemann | June 12, 1906 |
| 866,758 | Wheeler | Sept. 24, 1907 |
| 1,450,462 | Terhune | Apr. 3, 1923 |
| 1,998,432 | Busenburg | Apr. 23, 1935 |
| 2,035,845 | Stanton | Mar. 31, 1936 |
| 2,136,793 | Gabeler et al. | Nov. 15, 1938 |
| 2,406,297 | Johnston | Aug. 20, 1946 |